US00RE35444E

United States Patent [19]

Matsuda et al.

[11] E Patent Number: Re. 35,444

[45] Reissued Date of Patent: Feb. 11, 1997

[54] INK WASHING DEVICE FOR A PRINTING MACHINE

[75] Inventors: Fumio Matsuda, Toyohashi; Isao Chonan, Ichinomiya; Hideo Kitagawa, Gifu; Katsunori Furuta, Mino, all of Japan

[73] Assignee: Sakurai Graphic Systems Corporation, Tokyo, Japan

[21] Appl. No.: 554,363

[22] Filed: Nov. 6, 1995

Related U.S. Patent Documents

Reissue of:

[64] Patent No.: 5,325,780
Issued: Jul. 5, 1994
Appl. No.: 28,798
Filed: Mar. 9, 1993

[30] Foreign Application Priority Data

Dec. 28, 1992 [JP] Japan ..... 4-349465

[51] Int. Cl.[6] ..... B41F 35/00; B41F 33/00

[52] U.S. Cl. ..... 101/424; 101/425; 101/484

[58] Field of Search ..... 101/423–425, 101/DIG. 45, DIG. 47, 484

[56] References Cited

U.S. PATENT DOCUMENTS

| | | | |
|---|---|---|---|
| 3,800,702 | 4/1974 | Roberts | 101/425 |
| 4,686,902 | 8/1987 | Allain et al. | 101/424 |
| 4,781,115 | 11/1988 | Ueda et al. | 101/425 |
| 4,967,664 | 11/1990 | Iijima | 101/423 |
| 5,105,740 | 4/1992 | Loos et al. | 101/424 |
| 5,119,132 | 6/1992 | Butler | 355/208 |

FOREIGN PATENT DOCUMENTS

| | | | |
|---|---|---|---|
| 2944322 | 5/1981 | Germany | 101/DIG. 45 |
| 00050144 | 3/1987 | Japan | 101/423 |
| 0162243 | 7/1988 | Japan | 101/DIG. 45 |
| 0941214 | 7/1982 | U.S.S.R. | 101/DIG. 45 |

*Primary Examiner*—Edgar S. Burr
*Assistant Examiner*—Anthony H. Nguyen
*Attorney, Agent, or Firm*—Hickman Beyer & Weaver

[57] ABSTRACT

An ink washing device is disclosed, for use in a printing machine having a deposit roller with a variable luminance outer surface. The washing device includes a blade disposed adjacent to the deposit roller, for removing excess deposit of ink on the outer surface of the deposit roller, thus causing its luminance to vary. A luminance sensor detects changes in the luminance of the outer surface. The washing operation is interrupted or continued based on the detected luminance changes.

13 Claims, 6 Drawing Sheets

INK WASHING DEVICE FOR A PRINTING MACHINE

Matter enclosed in heavy brackets [ ] appears in the original patent but forms no part of this reissue specification; matter printed in italics indicates the additions made by reissue.

BACKGROUND OF THE INVENTION

This application claims the priority of Japanese Patent Application No. 4-349465 filed Dec. 28, 1992, which is incorporate herein by reference.

1. Field of the Invention

The present invention relates to a device for washing the ink rollers of a printing machine. More particularly, the invention pertains to a device capable of automatically washing the ink rollers.

2. Description of the Related Art

In general, printed materials such as pamphlets, catalogs and the like, are normally printed by an offset printing machine. The offset printing machine enables multiple color printing, and is suitable for producing a large quantity of paintings. The printing machine is equipped with a plurality of ink rollers which convey ink from an ink tank to a plate cylinder. The ink rollers are disposed between the ink tank and the plate cylinder, for feeding the ink from the ink tank to the plate cylinder. The ink used for printing, forms layers on the outer surface of the ink rollers. The ink on the rollers needs to be washed away before using ink of another color or after the completion of the printing operation.

Usually, an operator puts washing fluid on the ink rollers, and washes them. A blade is pressed against the surface of a lower roller, adjacent to the plate cylinder, to scrape off the ink from the surface of that lower roller, as it rotates. However, this cleaning work is cumbersome.

Some attempts have been made to improve the washing operation. One such attempt is described in the Japanese Unexamined Patent Publication No. 62-50145, which describes an ink washing device which automatically sprays washing fluid from a nozzle, by operating a switch. The ink washing device includes a tank containing washing fluid, which is connected to a nozzle for spraying the washing fluid is sprayed on the ink rollers. Subsequently, a blade is pressed against the outer surface of the ink roller adjacent to the plate cylinder in order to remove the layer of ink that deposited thereon.

The completion of the washing operation in the above washing device is determined by calculating the number of times N the ink roller is sprayed, or the period of time for spraying. In the Japanese Unexamined Patent Publication No. 62-50145, the number of times N or the period time of washing fluid spraying is preset, depending upon the ink condition of ink roller surface. However, the condition of the ink on the ink rollers might vary, and the washing efficiency might not be equally efficient for different types of ink or washing fluid.

As a result, the washing operation could end regardless of the condition of the rollers, since the washing period or the amount of washing fluid is predetermined. When the number N is below an adequate level, the amount of the washing fluid sprayed on the rollers is insufficient, and the rollers are not cleaned completely. If the printing is resumed after such incomplete washing, the printing quality could become inadequate.

To avoid this problem, the amount of post-washing residual ink on the ink rollers must be checked by the operator. When the washing period is not long enough to clean the rollers, the ink rollers must be washed again. However, this operation is cumbersome, since the washing device needs to reset the washing period several times until the roller is properly washed. Also, the printing problem can be avoided in another way, such as by presetting the number N to a relatively high value. However, when this number N is too high, the washing fluid could be continuously sprayed even after the rollers become clean. Therefore, the washing fluid and time are wasted, and the work efficiency problems remain.

SUMMARY OF THE INVENTION

Accordingly, it is an object of the present invention to provide a washing device for a printing machine which operates economically, efficiently and easily, without interfering with the printing operation.

To achieve the forgoing and other objects, and in accordance with the purpose of the invention, there is disclosed an ink washing device for a printing machine. The ink washing device is for use in a printing machine having a deposited roller with a variable luminance outer surface. The washing device includes a blade disposed adjacent to the deposit roller, for removing excess deposit of ink on the outer surface of the deposit roller, thus causing its luminance to vary. A luminance detector detects changes in the luminance of the outer surface of the deposit roller. The washing operation is interrupted or continued based on the detected luminance changes. Consequently, since the completion of the washing operation is determined by a luminance detector, and since the ink washing operation stops automatically the present device performs an efficient washing of the rollers. Furthermore, the amount of washing fluid required for the washing operation is minimized, since the washing operation stops just after the completion of the washing operation.

BRIEF DESCRIPTION OF THE DRAWINGS

The features of the present invention that are believed to be novel are set forth with particularity in the appended claims. The invention, together with the objects and advantages thereof, may best be understood by reference to the following description of the preferred embodiments, together with the accompanying drawings, in which:

DETAILED DESCRIPTION OF THE PREFERRED EMBODIMENT

A preferred embodiment of a washing device for a printing machine according to the present invention will now be described in detail referring to FIGS. 1 to 4.

Figure 2:
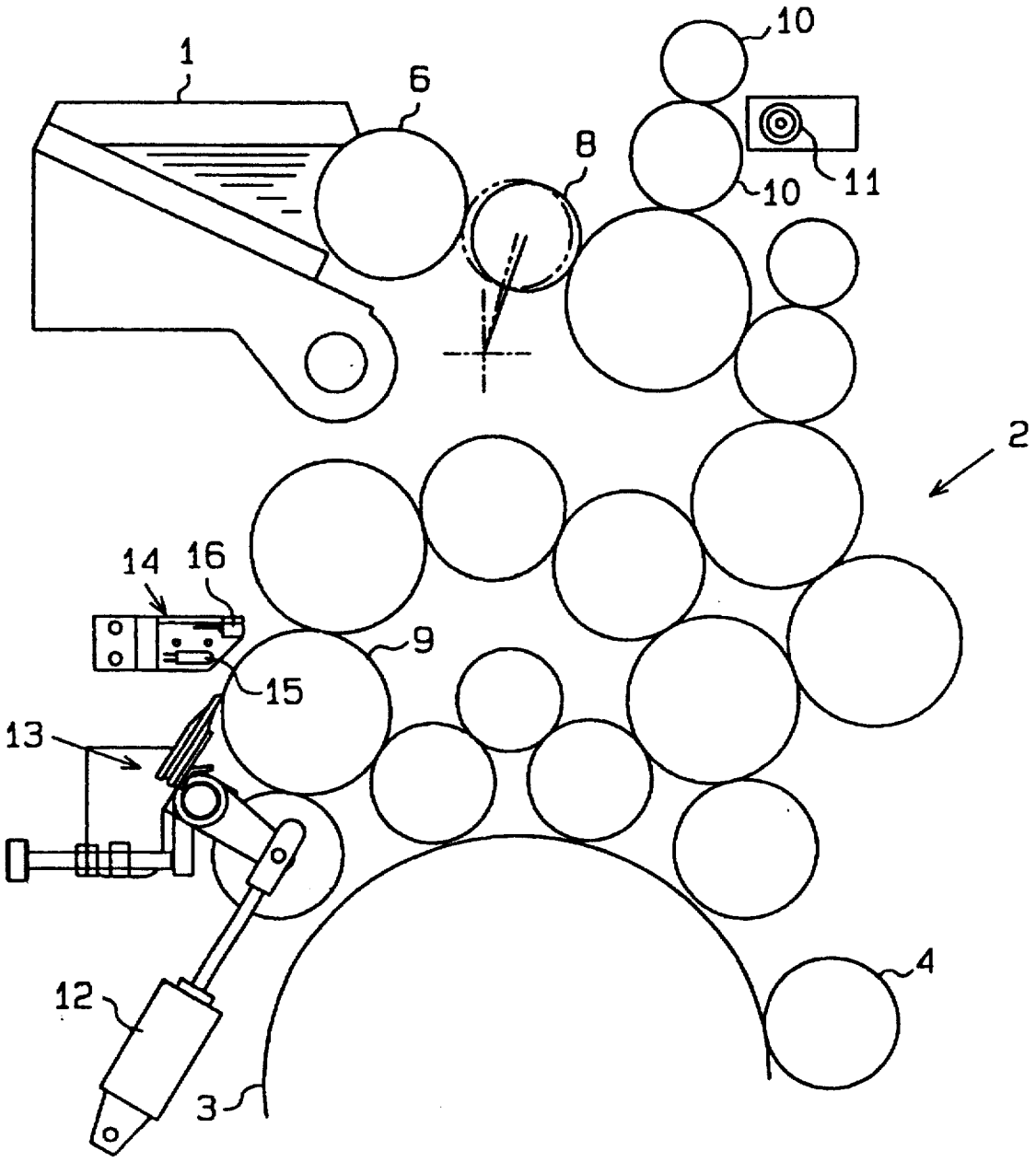
FIG. 2 is a front view of the printing unit of the printing machine which includes a washing device.

In the offset printing machine illustrated in FIG. 2, ink is transferred from an ink tank 1 to the plate cylinder 3, via a set of ink rollers 2, and is mixed with water on the plate cylinder 3. The ink is fed to the ink rollers 2 through a base roller 6 and a transfer roller 8. Excess ink is fed toward the plate cylinder 3 side through the rotating ink rollers 2 and is deposited on a deposit roller 9.

A spray nozzle 11, for spraying washing fluid, is disposed adjacent to a pair of ink rollers 10, which are located at the upper side of the ink rollers 2. The washing fluid is sprayed from the spray nozzle 11 onto the ink rollers 10, at predetermined time intervals. The washing fluid is transferred to the deposit roller 9, via the ink rollers 2. The ink layers formed on the deposit roller 9 is softened by the washing fluid. Usually light oil is used for the washing fluid. At the same time, a blade 13 is driven by an air cylinder 12, which is disposed in the vicinity of the deposit roller 9. As the blade 13 is pressed against the surface of the deposit roller 9, it scrapes off and removes the ink layers that have deposited on the outer surface of the deposit roller 9.

An opto-electrical luminance sensor 14 is placed near the surface of the deposit roller 9, to monitor the amount of the ink remaining on the surface of the deposit roller 9.

Figure 1:
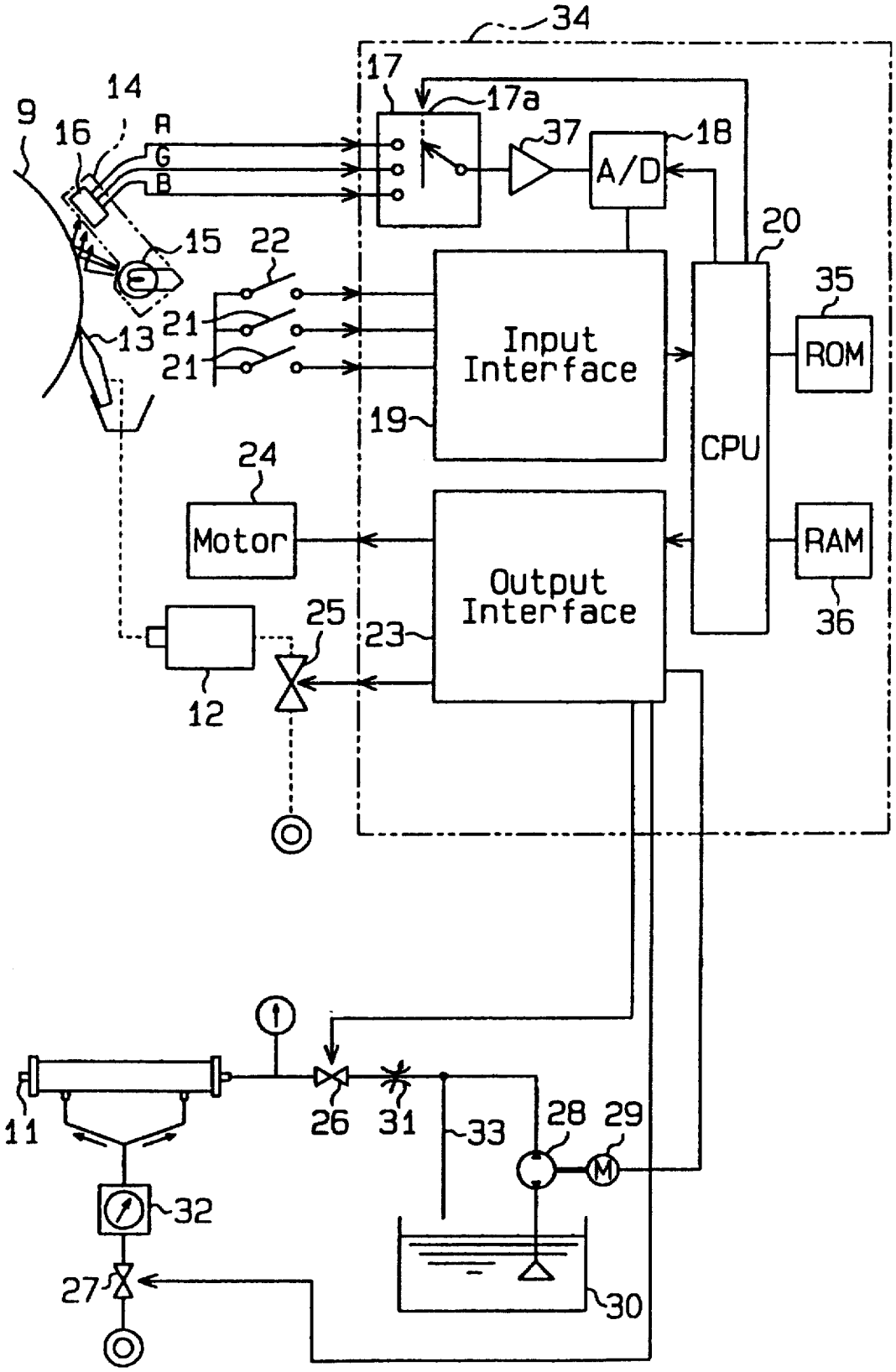
FIG. 1 is a block diagram of the printing machine showing an electric circuit and piping layout of an air pipe, and a washing fluid pipe provided on a printing machine, in accordance with the preferred embodiment of the present invention.

An electrical layout and a pipe arrangement of the printing machine are described below with reference to FIG. 1.

The luminance sensor 14 comprises a lighting device 15 and a photo detector 16. White light from the lighting device 15 is projected onto the surface of the roller 9. The reflected light from the surface of the roller 9 is then detected by the photo detector 16. Luminance signals corresponding to three colors, red, green and blue are generated as analog data.

The output terminals of the luminance sensor 14 are connected to a control unit 34. The control unit 34 comprises CPU (Central Processing Unit) 20 and peripheral devices to control the printing machine. In the control unit 34, the output terminals of the luminance sensor 14 are connected to a multiplexer 17, which selects one of the signals at the predetermined interval from the sensor 14 and transmits it to output.

A control terminal 17a, of the multiplexer 17, is connected to the CPU 20, and receives a signal from the CPU 20 to select one luminance signal from the red, green and blue signals. This multiplexing operation is proceeded three times to transmit three colors. This multiplexer reduce the number of wiring and amplifiers of the control unit 34. The output terminal of the multiplexer 17 is connected, via an amplifier 37, to an analog-to-digital converter 18, which converts the analog signals into digital signals. The digital signals from the analog-to-digital converter 18 are transmitted to the CPU 20, via an input interface 19.

ROM (Real only Memory) 35 and RAM (Random Access Memory) 36 are connected to the CPU 20. A program for controlling the printing machine, is stored in the ROM 35, and data are temporarily stored in the RAM 36 A change in the luminance, during the predetermined sampling periods, is calculated by the CPU 20, from the signals generated by the luminance sensor 14. The washing operation of the ink rollers 2 is determined to be completed, when the luminance signals are kept constant for a predetermined period of time. Accordingly, the washing operation is interrupted.

A selector switch 21 and a starter switch 22 are connected to the CPU 20 via the input interface 19. One of the printing units is selected to be washed by the selector switch 21, and the washing operation is started by the starter switch 22.

A motor 24 drives the ink rollers of the printing machine, and is connected to an output interface 23, which, in turn, is connected to the CPU 20. A solenoid valve 25 regulates an air cylinder 12, and is connected to the output interface 23. The air cylinder 12 actuates the blade 13, and is connected to the solenoid valve 25, by way of an air pipe. A solenoid valve 26, regulates the washing fluid flow, and a solenoid valve 27, regulates the air flow, both of which are connected to the output interface 23. A motor 29 drives a washing fluid pump 28, and is connected to the output interface 23.

The washing fluid pump 28 is located between the washing fluid tank 30 and the spray nozzle 11. The solenoid valve 26 is located between the pump 28 and the spray nozzle 11. A variable pressure control orifice 31 regulates the pressure of the washing fluid at desirable value and maintains it at a constant value. It is located between the solenoid valve 26 and the pump 28. The washing fluid in the tank 30 is pumped by the pump 28 and supplied to the spray nozzle 11 at a constant flow rate, which is controlled by the orifice 31, while the solenoid valve 26 is opened. When the solenoid valve 26 is closed, the orifice 31 does not function and the washing fluid is returned to the tank 30, through the return pipe 33.

A compressed air generator comprises a compressor, not shown, and is connected to the spray nozzle 11, via the solenoid valve 27. A regulator 32 regulates the air pressure, and is disposed between the spray nozzle 11 and the solenoid valve 27. The solenoid valve 27 is operated synchronously with the solenoid valve 26, by a signal transmitted from CPU 20, and is opened to supply the air to the spray nozzle 11. The washing fluid from the washing fluid pipe and the compressed air from the air pipe are mixed together at the nozzle 11. The nozzle 11 sprays a mist of washing fluid onto the ink rollers 10.

Figure 3:
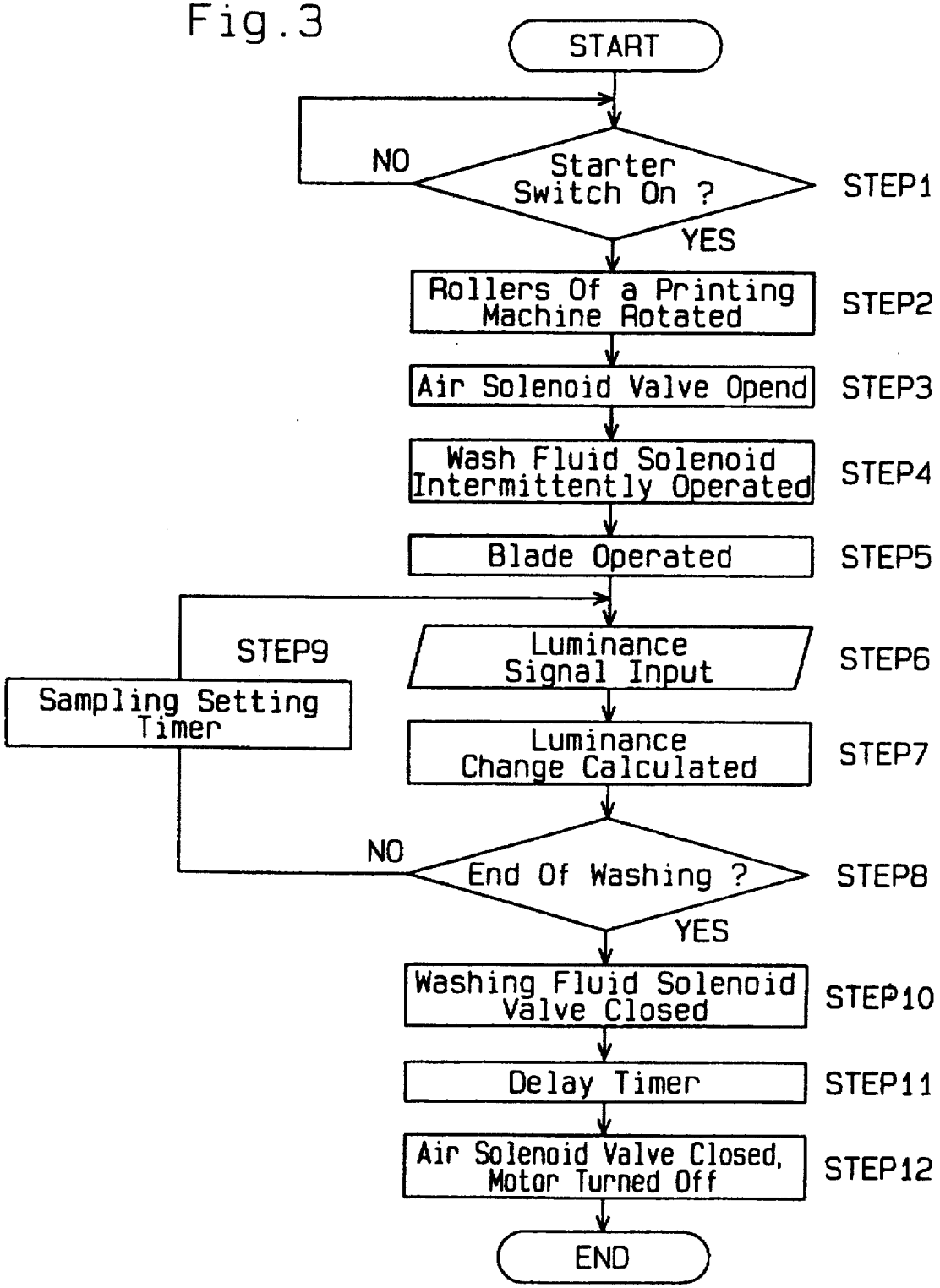
FIG. 3 is a flow chart showing the washing operation of the washing device of FIG. 2.

The operation of the ink washing device of the above offset printing press will be described below with reference to the flow chart of FIG. 3. The routine, as illustrated by the flow chart is executed under the control of the CPU 20, in accordance with the program stored in the ROM 35.

The motor 24 is started by operating the starter switch 22 (step 1) to rotate each roller of the printing machine (step 2). After a certain period of time, the solenoid valve 27 is opened (step 3) to supply compressed air to the nozzle 11. At the same time, the solenoid valve 26 is opened to supply the washing fluid, from the nozzle 11 to be sprayed onto the ink rollers 10.

The amount of the washing fluid needed for the washing operation is determined at an appropriate level for each printing machine. Excess washing fluid causes the ink rollers to slip. Furthermore, excess washing fluid drops onto the plate cylinder and produces poor printing. In order to supply the appropriate amount of washing fluid, the solenoid valve 26 is intermittently opened to control the amount of the washing fluid while the ink rollers 2 are rotated (step 4).

When the washing fluid then reaches the deposit roller 9, the hardened ink deposited on the ink rollers 2 is softened by the washing fluid, and is gradually sent to the deposit roller 9 in accordance with the rotation of the rollers 2. The blade 13 is pressed against the roller 9 (step 5), and the softened ink is scraped off the surface of the roller 9.

The photo detector 16 detects the luminance of the outer surface of the roller 9, and generates three corresponding luminance signals for the red, green and blue colors. The photo detector 16 then transmits these luminance signals to the output, as analog signals. These analog luminance signals are, in turn, transmitted to the analog-to-digital converter 18, via the multiplexer 17 and the amplifier 37. The analog signals are converted into digital data, and are then sent to the RAM 36 via the input interface 19 (step 6), where they are stored.

Then, the data is compared with the previously stored data to calculate the value of luminance change, by subtracting the previous luminance data from the newly detected luminance data (step 7). When all luminance changes of the three colors are determined to be less than a preset value, for a predetermined period of time, the washing operation is considered to be adequate (step 8).

On the other hand, if any one of the three luminance changes is greater than the preset value, the washing operation is considered to be incomplete and is continued. In this case, the routine returns to step 6, and proceeds with another washing operation, after the next sampling period has elapsed (step 9), and new signals are detected by the luminance sensor 14 (step 6).

Figure 4:
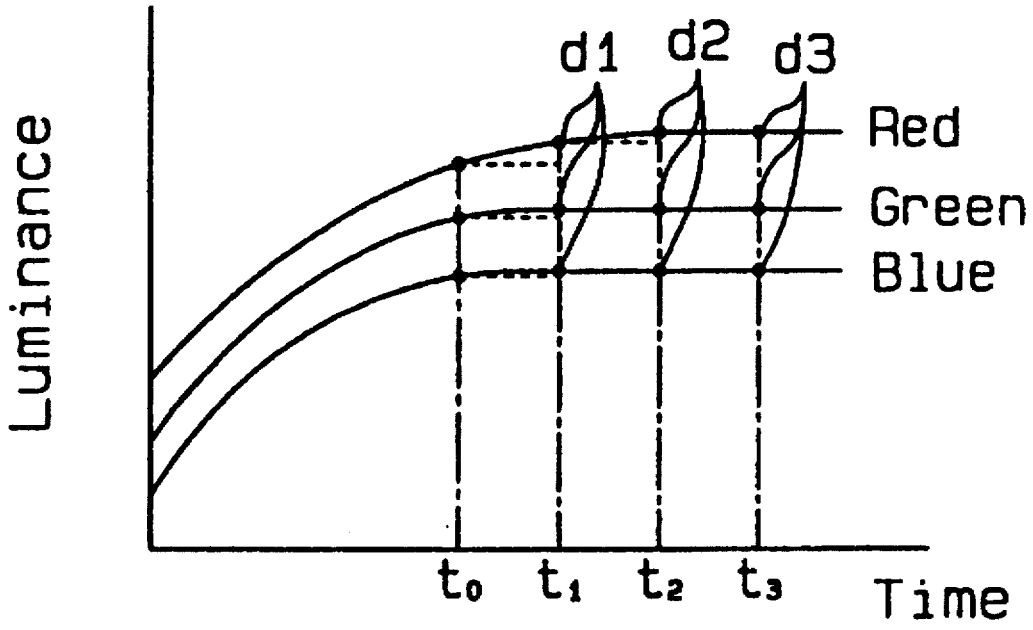
FIG. 4 includes three graphs showing the relationship between the luminance changes and time.

The method for determining the completion of the washing operation will be described below with reference to the luminance signal changes illustrated in FIG. 4.

At time $t_1$, a luminance change $d_1$ is calculated by subtracting the previous luminance signal at time $t_0$, from the luminance signal at time $t_1$. If all the luminance changes $d_1$ of the three colors, red, green and blue, are greater than the predetermined value (i.e. zero), the washing operation is determined to be incomplete. At time $t_2$, the calculated result indicates that the luminance change of the red signal is greater than the predetermined value (i.e. zero). Therefore, the washing operation is still determined to be incomplete. At time $t_3$, all three luminance changes $d_3$ are zero, and the washing operation is determined to be complete.

This method for determining the completion of the washing operation, by calculating the luminance change, is more practical than the method of monitoring only the luminance level. This method provides a more accurate determination, since the method of the present invention is not effected by the ink color and the color of the deposit roller 9.

When the washing operation is determined to be complete, the solenoid valve 26 is closed first, and the washing fluid supply is stopped (step 10). A delay timer allows the solenoid valve 27 to be kept open for a predetermined period of time, after the washing fluid valve 26 was closed (step 11), in order to blow away the remaining washing fluid in the nozzle 11.

After a present period of time has elapsed, the solenoid valve 27 is closed, and the motor 29 is stopped. The blade 13 is moved away from the roller 9. The motor 24 is stopped, and the ink rollers 2 are also stopped (step 12). The overall washing operation is completed by executing the foregoing steps.

Accordingly, the ink washing device of the present invention determines the completion of the ink washing operation with the luminance sensor 14, and automatically stops the washing operation. This new washing method prevents printing problems caused by incomplete ink washing. Additionally, the amount of washing fluid and time is minimized, since the washing operation automatically stops after the completion of the washing operation.

Another embodiment applied to a multi-color offset printing press, is described below with reference to FIGS. 5 and 6. The elements which have been described above will not be duplicated, and the same reference numerals as used above will be used in connection with, the same elements in this alternative embodiment.

Figure 5:
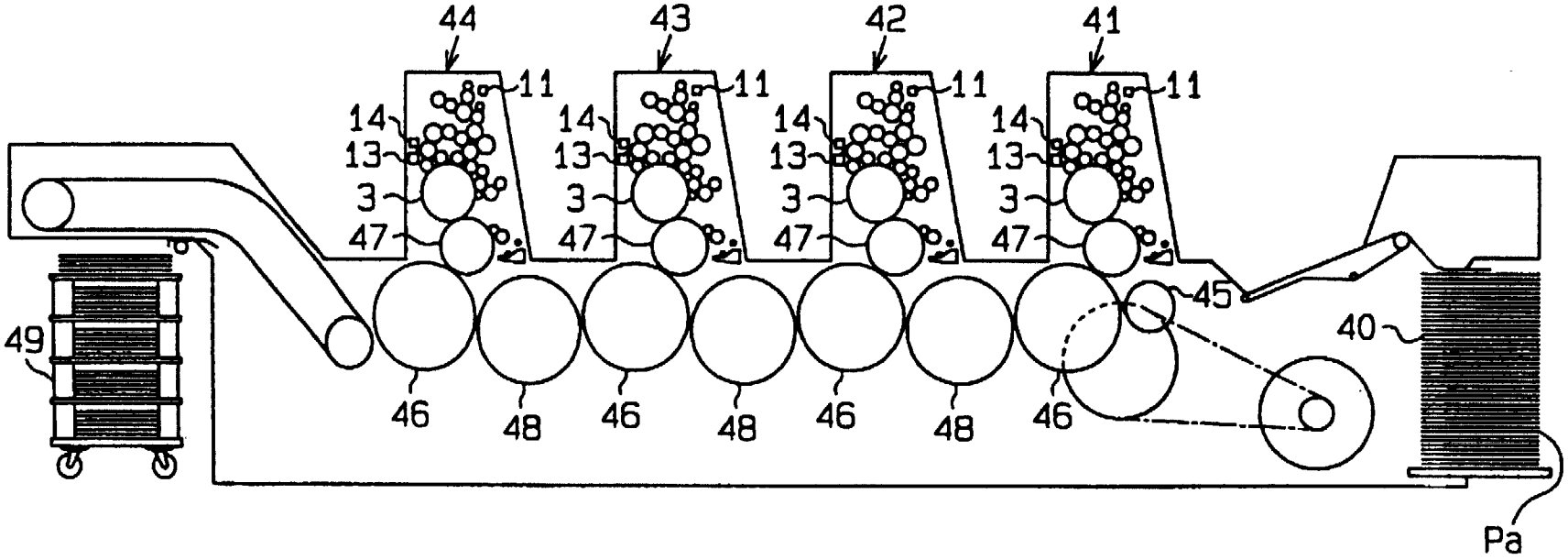
FIG. 5 is a schematic front view diagram of the printing machine according to another embodiment.

In the four color offset printing press shown in FIG. 5, a printing paper Pa is fed from a feeder 40 to a first printing unit 41, via a transfer cylinder 45. The paper Pa is kept on the surface of a rotatable impression cylinder 46, and contacts the surface of a blanket cylinder 47 at which a first color is printed. As the impression cylinder 46 rotates, the blanket cylinder 47 also rotates, and printing is performed on the paper Pa. The paper Pa is then transferred to an impression cylinder 46 of a second printing unit 42, via an intermediate transfer cylinder 48. The paper Pa is fed rotatable impression cylinder 46, and contacts the surface of a blanket cylinder 47 where a second color is to be printed. The paper Pa is then transferred to third and fourth printing units 43 and 44, respectively, where third and fourth colors are to be printed, respectively. Once printing on the paper Pa is completed, it is transferred to a delivery cart 49.

Figure 6:
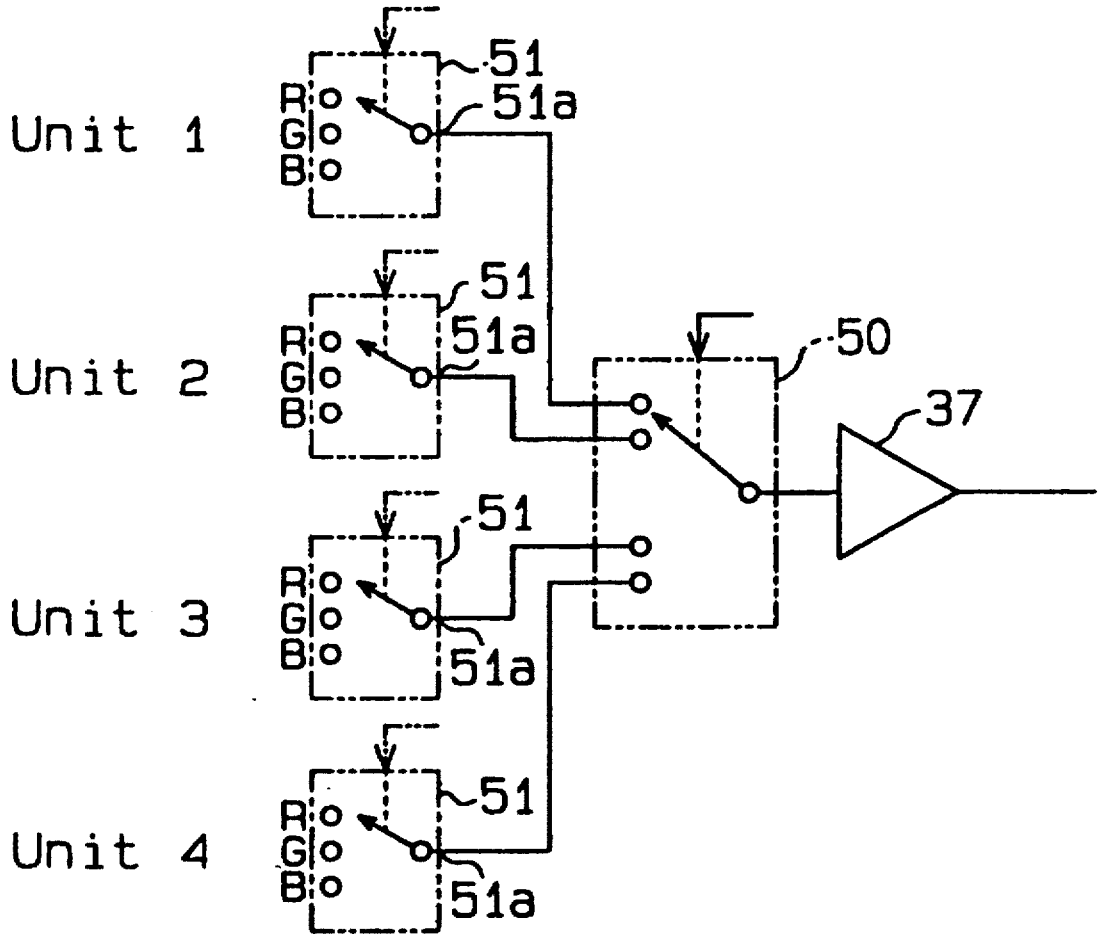
FIG. 6 is a circuit diagram of the printing machine showing a part of an electric circuit provided in the printing machine of FIG. 5.

Referring now to FIG. 6, the control unit 34 of the four color offset printing press comprises four multiplexers 51 and one multiplexer 50, which selectively transmit a luminance signal from a photo detector 16 to the CPU 20. The output terminals 51a of each multiplexer are connected to input terminals of the multiplexer 50. The multiplexer 50 sequentially selects one of the printing units 41 to 44 at a time. The multiplexer 51 selects one luminance signal from the red, green or blue colors, and transmits it to the multiplexer 50. The washing fluid is sprayed from a spray nozzle 11 provided in each printing unit 41 to 44, when the ink washing operation starts. The washing operation of the printing units 41 to 44, is monitored by one control unit 34 and the luminance sensors 14 due to the multiplexer 50. The washing operation is interrupted when the washing operation is determined to be completed. The washing operation of each unit is interrupted independently. The ink washing of four or more printing units can be controlled by only one control unit 34 provided with the multiplexers 50, 51.

Although only two embodiments of the present invention have been described herein, it should be apparent to those skilled in the art that the present invention may be embodied in many other specific forms, without departing from the spirit or scope of the invention.

For example, in the foregoing embodiments, the spray nozzle 11 is arranged to spray two ink rollers 10. However, the spray nozzle 11 can alternatively be arranged to spray one or more other ink rollers. Moreover, a stepping motor can be used instead of the air cylinder 12 for actuating the blade 13. Therefore, the present examples and embodiments are to be considered as illustrative and not restrictive, and the invention is not to be limited to the details given above, but may be modified within the scope of the appended claims.

What is claimed is:

1. An ink washing device, for performing a washing operation in a printing machine, the printing machine including a plurality of ink rollers for supplying ink to a cylinder plate, a deposit roller having an outer surface where excess ink from the ink rollers is deposited, said outer surface having a luminance that varies with the amount of the deposited ink, and a spraying device for spraying washing fluid on at least one ink roller to initiate a washing operation, the ink washing device comprising:

scraping means, disposed adjacent to said deposit roller, for removing the deposited ink on said outer surface; and operating detection means for determining the completion of the washing operation, said operating detection means including a luminance detector means responsive to said luminance of said outer surface during removal of the deposited ink, said operating detection means indicating completion of the washing operation when a luminance signal from the luminance detector means exhibits substantially no change.

2. The ink washing device according to claim 1, wherein said luminance signal includes red, green and blue luminance signals.

3. The ink washing device according to claim 2, wherein said operation detection means includes selector means for selecting one of said red, green or blue luminance signals.

4. The ink washing device according to claim 1, including means supplying pressurized air and washing fluid to the spraying device; and further including:

a first solenoid valve for selectively interrupting the air supply to the spraying device;

a second solenoid valve for selectively interrupting the washing fluid supply to the spraying device; and delay timer means for causing said first solenoid valve to remain open for a predetermined period of time after said second solenoid valve is closed.

5. The ink washing device according to claim 4, including means operating said second solenoid valve intermittently, in order to control the amount of washing fluid sprayed from the spraying device.

6. The ink washing device according to claim 1, wherein the printing machine includes a plurality of printing units, the operation detection means includes a selector means for selecting one of said printing units, and each of said printing units includes luminance detection means for generating corresponding luminance signals.

7. An ink washing device, for performing a washing operation in a printing machine, the printing machine including a plurality of ink rollers for supplying ink to a cylinder plate, a deposit roller having an outer surface where excess ink from the ink rollers is deposited, said outer surface having a luminance that varies with the amount of the deposited ink, and a spraying device including an air supply and a washing fluid supply for spraying washing fluid on at least one ink roller to initiate a washing operation, the ink washing device comprising:

scraping means, disposed adjacent to said deposit roller, for removing the deposited ink on said outer surface;

operating detection means for determining the completion of the washing operation, said operating detection means including a luminance detection means responsive to said luminance of said outer surface during removal of the deposited ink, said operating detection means indicating completion of the washing operation when a luminance signal from the luminance detector remains substantially constant for a predetermined period of time;

a first solenoid valve means for selectively interrupting the air supply to the spraying device; and a second solenoid valve means for selectively interrupting the washing fluid supply to the spraying device.

8. The ink washing device according to claim 7, wherein said luminance detection means includes a color detector for generating a plurality of different luminance signals.

9. The ink washing device according to claim 8, wherein said operation detection means includes selector means for selecting at least one of said plurality of luminance signals.

10. The ink washing device according to claim 7, further including:

delay timer means that causes said first solenoid to remain open for a predetermined period of time after said second solenoid valve is closed.

11. The ink washing device according to claim 7, wherein said second valve means is operated intermittently in order to control the amount of washing fluid sprayed from the spraying device.

12. The ink washing device according to claim 7, wherein the printing machine includes a plurality of printing units, the operation detection means includes a selector means for selecting one of said printing units, and each of said printing units includes luminance detection means for generating corresponding luminance signals.

13. A method for performing a washing operation in a printing machine, the method comprising the steps of:

spraying washing fluid on at least one roller of the printing machine to initiate a washing operation;

scraping excess ink deposited on an outer surface of a deposit roller, which causes the luminance of said outer surface to change;

detecting changes in the luminance of said outer surface during said scraping, and generating a signal indicative of said changes; and determining the completion of the washing operation responsive to said signal remaining substantially constant.

* * * * *